United States Patent
Pritchard et al.

(10) Patent No.: US 11,668,835 B2
(45) Date of Patent: Jun. 6, 2023

(54) GNSS SPOOFING DETECTION USING CARRIER-TO-NOISE BASED MONITORING

(71) Applicant: Honeywell International Inc., Morris Plains, NJ (US)

(72) Inventors: Anthony Pritchard, Coon Rapids, MN (US); Karl Abraham Keyzer, Minneapolis, MN (US); James Arthur McDonald, New Brighton, MN (US)

(73) Assignee: Honeywell International Inc., Charlotte, NC (US)

( * ) Notice: Subject to any disclaimer, the term of this patent is extended or adjusted under 35 U.S.C. 154(b) by 358 days.

(21) Appl. No.: 16/937,293

(22) Filed: Jul. 23, 2020

(65) Prior Publication Data

US 2022/0026578 A1 Jan. 27, 2022

(51) Int. Cl.
*G01S 19/21* (2010.01)
*G01S 19/29* (2010.01)

(52) U.S. Cl.
CPC ............ *G01S 19/215* (2013.01); *G01S 19/29* (2013.01)

(58) Field of Classification Search
CPC .............................. G01S 19/215; G01S 19/29
USPC ............................................... 342/357.59, 16
See application file for complete search history.

(56) References Cited

U.S. PATENT DOCUMENTS

| 9,297,904 | B2 | 3/2016 | Scheitlin et al. | |
| 10,031,234 | B1 | 7/2018 | Alexander | |
| 10,545,246 | B1 | 1/2020 | Johnston et al. | |
| 2011/0102259 | A1 | 5/2011 | Ledvina et al. | |
| 2016/0154113 | A1* | 6/2016 | Leibner | G01S 19/21 342/357.59 |
| 2018/0299560 | A1* | 10/2018 | Zangvil | G01S 19/36 |

FOREIGN PATENT DOCUMENTS

| CN | 103954977 A | 7/2014 |
| CN | 107367740 A | 11/2017 |

OTHER PUBLICATIONS

European Patent Office, "Extended European Search Report from EP Application No. 21186271.9", from Foreign Counterpart to U.S. Appl. No. 16/937,293, dated Feb. 4, 2022, pp. 1 through 10, Published: EP.

* cited by examiner

*Primary Examiner* — Bo Fan
(74) *Attorney, Agent, or Firm* — Fogg & Powers LLC (57) ABSTRACT

Systems and methods for GNSS spoofing detection using C/No based monitoring are provided. In certain embodiments, a system including at least one GNSS receiver that provides C/No for GNSS signals received from GNSS satellites. The system also includes a processor coupled to the at least one GNSS receiver. The processor executes instructions that cause the processor to calculate new C/No comparison values based on the C/No measurements and previous C/No comparison values. Further, the instructions cause the processor to compare the C/No measurements against the previous C/No comparison values. Moreover, the instructions cause the processor to determine whether one or more of the GNSS signals are spoofed based on the comparison of the C/No measurements against the previous C/No comparison values. Additionally, the instructions cause the processor to set the new C/No comparison values as the previous C/No comparison values.

20 Claims, 3 Drawing Sheets

FIG. 3

GNSS SPOOFING DETECTION USING CARRIER-TO-NOISE BASED MONITORING

BACKGROUND

Many navigation systems receive measurements from satellites in a global navigation satellite system (GNSS). The navigation systems may rely on signals from the GNSS satellites to determine position and velocity information of an associated object, such as an aircraft, boat, automobile, personal electronic device, or other moving objects. The navigation systems may also use measurements acquired from the GNSS signals to bound drifts in measurements obtained from different sensors coupled to a navigation system.

Recently, the integrity, accuracy, and performance of navigation systems that use GNSS signals have come under threat due to the rise of GNSS spoofing activities. GNSS spoofing activities occur when a device other than the GNSS satellites transmits signals that imitate real GNSS signals or interfere with the accurate reception of real GNSS signals.

SUMMARY

Systems and methods for GNSS spoofing detection using carrier-to-noise based monitoring are provided. In certain embodiments, a system including at least one GNSS receiver that provides carrier to noise ratio (C/No) measurements for a plurality of GNSS signals received from a plurality of GNSS satellites. The system also includes a processor coupled to the at least one GNSS receiver. The processor executes instructions that cause the processor to calculate one or more new C/No comparison values based on the C/No measurements and one or more previous C/No comparison values. Further, the instructions cause the processor to compare the C/No measurements against the one or more previous C/No comparison values. Moreover, the instructions cause the processor to determine whether one or more of the plurality of GNSS signals are spoofed based on the comparison of the C/No measurements against the one or more previous C/No comparison values. Additionally, the instructions cause the processor to set the one or more new C/No comparison values as the one or more previous C/No comparison values.

DRAWINGS

Understanding that the drawings depict only some embodiments and are not, therefore, to be considered limiting in scope, the exemplary embodiments will be described with additional specificity and detail using the accompanying drawings, in which.

Per common practice, the various described features are not drawn to scale but are drawn to emphasize specific features relevant to the example embodiments.

DETAILED DESCRIPTION

In the following detailed description, reference is made to the accompanying drawings that form a part hereof, which is shown by illustration-specific illustrative embodiments. However, it is to be understood that other embodiments may be utilized and that logical, mechanical, and electrical changes may be made.

Systems and methods for providing global navigation satellite system (GNSS) spoofing detection using carrier-to-noise (C/No) based monitoring are provided. To detect spoofing, a navigation system that receives GNSS signals may perform one or more methods to detect GNSS spoofing. In some embodiments, the navigation system may create a composite average of raw or smoothed C/No to monitor for sudden increases. The sudden increases may indicate that the navigation system is receiving a spoofed signal. The navigation system may estimate the C/No using wide and narrow satellite-signal power band measurements and then monitor the estimated C/No estimation. Further, the navigation system may use a long-time-constant, smoothed C/No measurement to calculate an expected C/No value or measurement for comparisons.

In additional embodiments, the navigation system may monitor an indication of the expected C/No given the satellites' azimuth and elevation or the satellites' elevation relative to the navigation system. Moreover, the navigation system may monitor for common C/No decreases on multiple satellites within a small time window to determine when a GNSS spoofing device attempts to interfere with the real GNSS signals. Additionally, the navigation system may apply a filter to the C/No measurements to focus upon C/No frequency regions that are relevant to spoofing detection. Accordingly, the navigation system may use C/No measurements of received GNSS signals to determine whether the navigation system is receiving spoofed GNSS signals.

Figure 1:
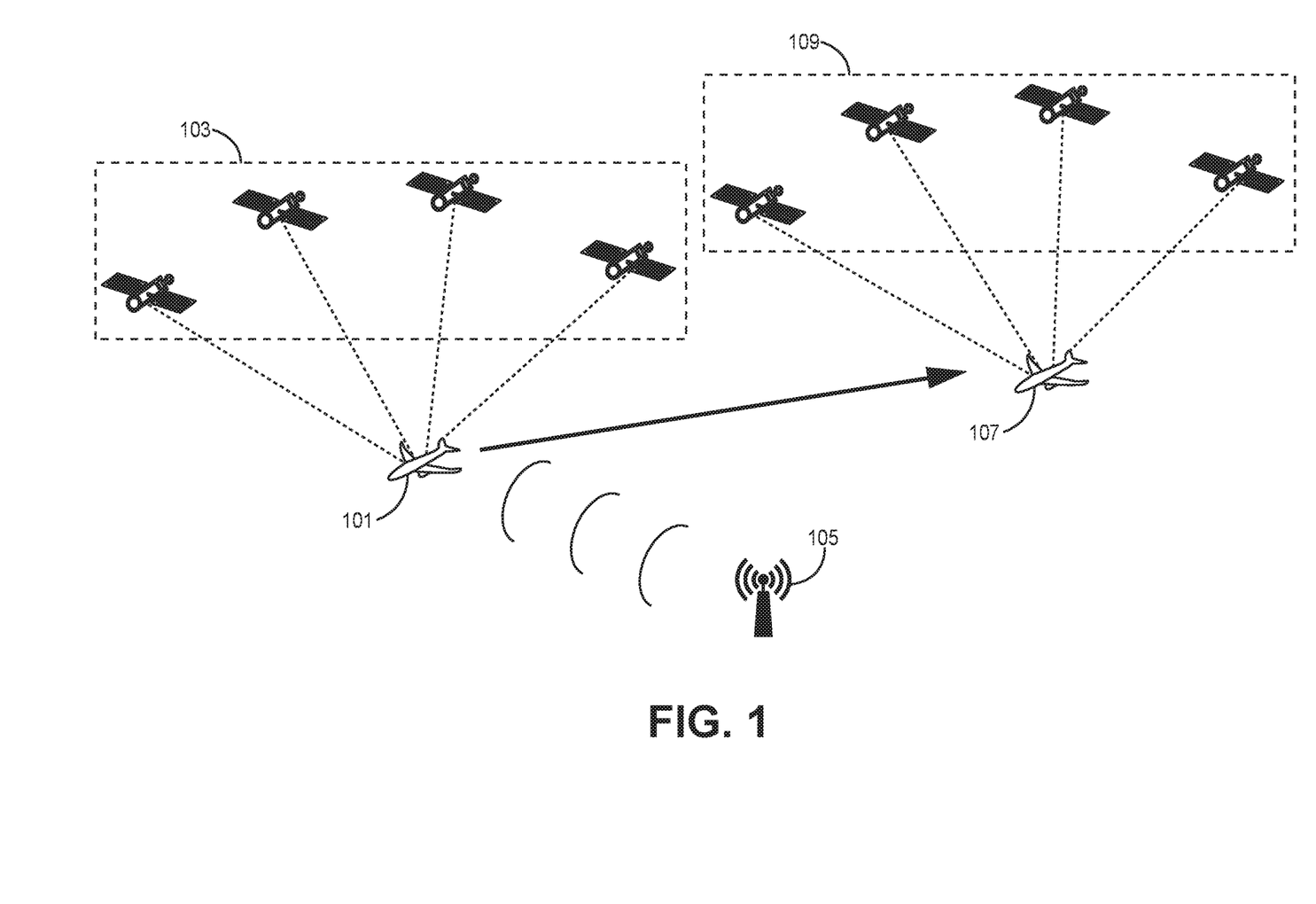
FIG. 1 is a diagram illustrating an aircraft experiencing GNSS spoofing according to an aspect of the present disclosure.

FIG. 1 is a diagram illustrating the effects of GNSS spoofing on a vehicle. While the diagram illustrates the vehicle as an airplane, the vehicle may be a boat, an automobile, a spacecraft, a missile, and the like. Further, as used herein, a vehicle may also refer to movable objects such as personal electronic devices. In many instances, vehicles and objects desire situational awareness. An important aspect of situational awareness is navigation information. As used herein, "navigation information" may refer to position, attitude, velocity, heading, among other parameters that could be used by a computational device, pilot, or operator when making decisions based on the received information.

In some embodiments, a vehicle may use measurements based on GNSS signals to calculate the navigation information. As used herein, a GNSS may include multiple satellites that orbit the earth and transmit signals. GNSS receivers can receive the transmitted signals and calculate position and velocity information when receiving signals from four or more GNSS satellites. For example, the GNSS receivers may calculate pseudo-range, delta-range, carrier measurements, and C/No. A GNSS may include one or more of the United States developed Global Position System (GPS), the Russian developed Global Navigation Satellite System (GLONASS), the European Union developed Galileo system, and the Chinese Developed BeiDou system, among other global or regional satellite navigation systems.

As shown in FIG. 1, a vehicle may be in communication with four or more GNSS satellites 103. A navigation system on the vehicle may receive signals from the GNSS satellites 103. The navigation system may use data in the received signals to calculate an estimated position 101 of the vehicle. For example, when the vehicle is an aircraft, the aircraft may use multiple acquired signals to calculate the estimated position 101, a velocity, and a heading for the moving aircraft. When the navigation system receives reliable GNSS signals from the GNSS satellites 103, the estimated position 101 may be a safe estimation of the true position of the vehicle.

Recently, people have used spoofing devices 105 to affect the integrity and accuracy of GNSS measurements. In the present disclosure, "spoofing devices" may generally refer to both interference devices and spoofing devices. As used herein, a spoofing device 105 may be any device that transmits radio frequency signals (spoofing signals) that may be received by a vehicle having a GNSS receiver, where the spoofing signals negatively affect the accuracy of the GNSS measurements. Some spoofing signals may cause the navigation system on the vehicle to calculate a spoofed position 107 that is substantially different from the estimated position 101 of the vehicle.

The spoofing device 105 may be an interference type spoofing device when the spoofing device 105 transmits signals that interfere with the aircraft's ability to receive signals from the GNSS satellites 103. For example, the GNSS satellites 103 may transmit GNSS signals over a range of frequencies; the spoofing device 105 may transmit noisy signals over the same range of frequencies. Additionally, the spoofing device 105 may transmit the signals at a power that is large enough to be greater than the power of the GNSS signals when received by the vehicle near the estimated position 101. The aircraft near the estimated position 101 may experience errors in measurements based on the received GNSS signals or be unable to receive one or more GNSS signals from the GNSS satellites 103. Due to the errors in the measurements or lack of measurements, the vehicle near the estimated position 101 may miscalculate navigation information and calculate the vehicle as being at the spoofed position 107.

In other embodiments, the spoofing device 105 may imitate the transmission of GNSS signals from the GNSS satellites 103. When the navigation system of the vehicle receives the spoofed signals from the spoofing device 105, the navigation system of the vehicle may use the information in the spoofed signals instead of the information in the signals from the GNSS satellites 103. When the spoofing device 105 has fooled the navigation system into using the spoofed signals instead of the actual GNSS signals, the spoofing device 105 may provide misleading information to the navigation system of the vehicle. The misleading information may cause the navigation system to believe the GNSS satellites 103 are at an alternate satellite position 109 instead of the true satellite position. When the navigation system receives the misleading information, the navigation system may calculate a spoofed position 107 that is significantly different (and potentially dangerous) from the desired estimated position 101.

In some embodiments, the spoofing device 105 may send signals to jam the reception of GNSS signals and imitate the GNSS signals. For example, the spoofing device 105 may attempt to jam the reception of GNSS signals such that the vehicle cannot receive GNSS signals. After some time of transmitting the jamming signals, the spoofing device 105 may send imitation GNSS signals. As the vehicle attempts to receive the GNSS signals, the vehicle may receive the spoofed signals from the spoofing device 105 instead of the actual GNSS signals from the GNSS satellites 103. Frequently, the spoofing device 105 transmits signals at a higher power than the signals broadcast by the GNSS satellites 103. When the vehicle is using the spoofed signals as if they were authentic GNSS signals, a controller of the spoofing device 105 may send misleading information to the vehicle, causing the vehicle to calculate its position at the spoofed position 107 instead of the desired estimated position 101.

Figure 2:
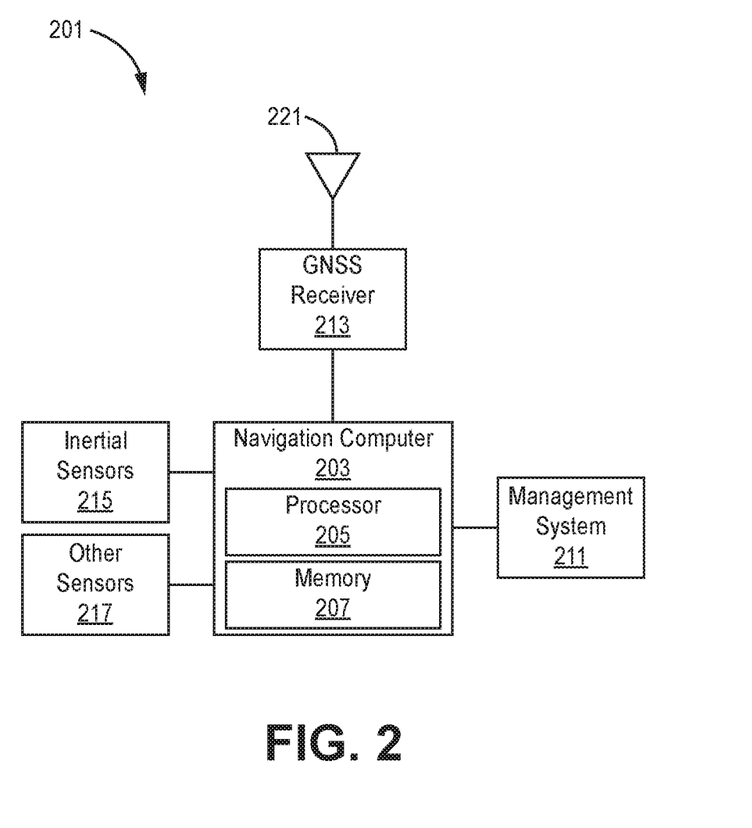
FIG. 2 is a block diagram illustrating an exemplary navigation system for detecting GNSS spoofing according to an aspect of the present disclosure.

FIG. 2 is a block diagram of a navigation system 201 for performing GNSS spoofing detection using C/No based monitoring. The navigation system 201 may be mounted to a vehicle, such as an aircraft, sea craft, spacecraft, automobile, or other vehicle type. Alternatively, the navigation system 201 may be located on or as part of a movable object, such as a phone, personal electronics, land surveying equipment, or other objects that are capable of being moved from one location to another. The navigation system 201 may acquire navigation information from one or more different sources. To process the acquired navigation information, the navigation system 201 may include a navigation computer 203. The navigation computer 203 may further include at least one processor 205 and at least one memory 207.

In certain embodiments, the navigation system 201 may acquire navigation information that includes inertial motion information. The navigation system 201 may obtain the inertial motion information through inertial sensors 215 that measure and sense the motion of the object mounted to the navigation system 201. For example, the navigation system 201 may be an inertial navigation system (INS) that receives raw inertial data from a combination of inertial sensors 215, such as gyroscopes and accelerometers. Alternatively, the inertial sensors 215 may be an INS that provides processed inertial navigation data acquired from inertial measurements to the navigation computer 203.

In further embodiments, the navigation system 201 may include additional sensors that can provide navigation data. For example, the navigation system 201 may include one or more other sensors 217. For example, the one or more other sensors 217 may include a vertical position sensor such as an altimeter. Also, the one or more other sensors 217 may include one or more electro-optical sensors, magnetometers, barometric sensors, velocimeters, and different sensor types.

The navigation system 201 may use GNSS measurements to determine navigation information. The navigation system 201 may receive GNSS measurements through a GNSS receiver 213. Also, the GNSS receiver 213 may receive GNSS signals through a GNSS antenna 221. The GNSS antenna 221 may be separate antennas or an antenna array that uses beam-steering to acquire GNSS signals for the GNSS receiver 213. The GNSS receivers 213 may couple to the GNSS antenna 221 and receive GNSS signals from multiple GNSS satellites in the line of sight of the GNSS antenna 221. While FIG. 2 shows the navigation system 201 as including a single GNSS receiver 213 and associated GNSS antenna 221, the navigation system 201 may include multiple GNSS antennas and GNSS receivers that provide GNSS measurements to the navigation computer 203.

The processor 205 and other potential computational devices used in the navigation system 201, the management system 211, or other systems and methods described herein may be implemented using software, firmware, hardware, or other appropriate combination. The processor 205 and other computational devices may be supplemented by, or incorporated in, specially-designed application-specific integrated circuits (ASICs) or field programmable gate arrays (FPGAs). In some implementations, the processor 205 and other potential computational devices may communicate through an additional transceiver with other computing devices outside of the navigation system 201, such as those associated with the management system 211 or computing devices associated with other subsystems controlled by the management system 211. The processor 205 and other computational devices may also include or function with software programs, firmware, or other computer-readable instructions for carrying out various process tasks, calculations, and control functions used in the methods and systems described herein.

The methods described herein may be implemented by computer-executable instructions, such as program modules or components, which are executed by at least one processor, such as the processor 205. Generally, program modules include routines, programs, objects, data components, data structures, algorithms, and the like, which perform particular tasks or implement abstract data types.

Instructions for carrying out the various process tasks, calculations, and generation of other data used in the operation of the methods described herein can be implemented in software, firmware, or other computer-readable instructions. These instructions are typically stored on appropriate computer program products that include computer-readable media used to store computer-readable instructions or data structures. Such a computer-readable medium may be available media that can be accessed by a general-purpose or special-purpose computer or processor or any programmable logic device. For instance, the memory 207 may be an example of a computer-readable medium capable of storing computer-readable instructions and/or data structures. Also, the memory 207 may store navigation information such as maps, terrain databases, magnetic field information, path data, and other navigation information.

Suitable computer-readable storage media (such as the memory 207) may include, for example, non-volatile memory devices including semiconductor memory devices such as Random Access Memory (RAM), Read-Only Memory (ROM), Electrically Erasable Programmable ROM (EEPROM), flash memory devices, magnetic disks like internal hard disks or removable disks. Also, computer-readable storage media may include optical storage devices such as compact discs (CDs), digital versatile discs (DVDs), Blu-ray discs. In summary, computer-readable storage media may include any media that can carry or store desired program code in the form of computer-executable instructions or data structures.

The GNSS receiver 213 may receive GNSS satellite signals and extract position, velocity, and time data from the signals to acquire measurements of pseudo-range, delta-range, carrier, and C/No. The GNSS receiver 213 may provide the acquired measurements to the processor 205 for use in calculating a navigation solution for the vehicle associated with the navigation system 201. For example, executed code may cause the processor 205 to fuse the acquired measurements with measurements received from the inertial sensors 215 and the other sensors 217. Additionally, the memory 207 may store the acquired measurements for further analysis.

In certain embodiments, the processor 205 may receive C/No measurements from the GNSS receiver 213 and use the received C/No measurements to detect whether the navigation system 201 is receiving spoofing GNSS signals. As used herein, the C/No measurement may refer to the ratio of the power of a received GNSS signal from a particular satellite to the power of the noise. The processor 205 may compare the C/No against a previously calculated C/No comparison value to detect spoofing. After comparing the C/No value against the previous C/No comparison value, the processor 205 may calculate a new C/No comparison value for comparison against subsequently received C/No measurements. The processor 205 may calculate different C/No comparison values for each GNSS signal received by the GNSS receiver 213 or for combinations of the different GNSS signals.

In some embodiments, the processor 205 may calculate a composite average of received C/No measurements for the multiple GNSS satellites in communication with the GNSS receiver 213 as the C/No comparison value. The processor 205 may calculate the composite average based on raw C/No measurements. Alternatively, the processor 205 may apply a filter (such as a low pass filter), or other smoothing algorithms to smooth the received C/No measurements. The processor 205 may then calculate the composite average based on the smoothed C/No measurements. The processor 205 may compare received C/No measurements against the calculated composite average. When the processor 205 determines that the C/No suddenly increases compared to the composite average, the processor 205 may determine that the GNSS receiver 213 is receiving spoofed GNSS signals. Also, the processor 205 may then use the C/No measurement to update the composite average for subsequent comparisons.

In additional embodiments, the processor 205 may estimate the C/No using wide and narrow satellite-signal power band measurements from the GNSS receiver 213 when calculating the C/No comparison value. For example, to calculate a C/No using wide and narrow satellite-signal power band measurements, the processor 205 may receive the C/NO measurements from the GNSS receiver 213 for each GNSS signal received by the GNSS receiver 213. Additionally, the processor 205 may receive an indication that the C/No measurement is valid. The processor 205 may calculate a smoothed C/No using a filter or other data smoothing technique. For example, the processor 205 may calculate the smoothed C/No value based on periodically received C/No measurements from the GNSS receiver 213. The processor 205 may average the measurements or apply mathematical methods to remove outlying C/No measurements.

Additionally, the processor 205 may perform a consistency test on the received C/No measurements to identify drops in C/No measurement data that are consistent across the GNSS signals received by the GNSS receiver 213. The processor 205 may perform the consistency test by comparing a drop in C/No against an average drop for the GNSS receiver 213. The processor 205 may calculate the average drop by calculating the average difference between a smoothed C/No and the present C/No measurement received from the GNSS receiver 213 for the different GNSS satellites in communication with the GNSS receiver 213. The processor 205 may then compare the calculated drop in C/No for each signal against the average drop for signals received from some or all of the GNSS satellites in communication with the GNSS receiver 213. If the calculated drop deviates from the average drop by more than a predetermined threshold, the processor 205 may exclude the current C/No from subsequent calculations.

After calculating the smoothed C/No value and validating the C/No measurements from the GNSS receiver 213, the processor 205 may calculate a jammer power to noise power value. The processor 205 may calculate the jammer power to noise power value for the GNSS receiver 213 by calculating an average of the difference between the average smoothed C/No and the present C/No values. When the processor 205 calculates the jammer power to noise power value for the GNSS receiver 213, the processor 205 may calculate the average jammer power to noise power value by averaging several recently calculated jammer power to noise power value measurements.

Further, the processor 205 may calculate an instantaneous C/No based on the smoothed C/NO and the average jammer power to noise power value. For example, the processor 205 may calculate the instantaneous C/NO for the GNSS satellites in communication with the GNSS receiver 213 as the difference between the smoothed C/NO and the average jammer power to noise power value. When the processor 205 calculates the instantaneous C/NO, the processor 205 may use the instantaneous C/No for determining whether or not the GNSS receiver 213 is receiving spoofed GNSS signals using other methods described herein. The calculation of the instantaneous C/No is described in greater detail in U.S. Pat. No. 9,297,904, filed Nov. 30, 2012, titled "SYSTEMS AND METHODS FOR MONITORING BROADBAND RADIO FREQUENCY INTERFERENCE," which is incorporated herein by reference.

In further embodiments, the processor 205 may use a long time constant to calculate a smoothed C/No measurement and then calculate an expected value for the C/No from the smoothed data as the C/No comparison value. For example, the processor 205 may perform exponential smoothing to C/No measurements stored in the memory 207. The processor 205 may use a long time constant when filtering the data stored in the memory 207. Alternatively, the processor 205 may apply the filter as the processor 205 receives the C/No measurements from the GNSS receiver 213. After using the smoothing, the processor 205 may calculate an expected value for the smoothed C/No data. The processor 205 may then compare received C/No measurements against the present expected value. If the received C/No measurement (or a series of received C/No measurements) is greater than the expected value, the processor 205 may determine that associated GNSS signals are spoofed GNSS signals.

In additional embodiments, the processor 205 may estimate a C/No measurement based on the GNSS satellites' azimuth and elevation or the satellite's elevation relative to the GNSS antenna 221 and use the estimated C/No measurements as a C/No comparison value. For example, the processor 205 may identify an expected location for the GNSS satellites that are presently communicating with the GNSS receiver 213. The processor 205 may then use the information about the GNSS satellite location and the present position of the GNSS antenna 221 to estimate a C/No measurement. In some implementations, the processor 205 may also consider the attitude of the object associated with the navigation system 201. For example, when the object is an aircraft, the processor 205 may consider whether parts of the aircraft obscure satellites from the GNSS antenna 221 and affect the C/No measurements provided by the GNSS receiver 213. The processor 205 may compare the estimated C/No measurement against the C/No measurement from the GNSS receiver 213. The processor 205 may perform a comparative test on the C/No measurement from the GNSS receiver 213 compared against the estimated C/No measurement. The processor 205 may determine whether the GNSS signals associated with the C/No measurement from the GNSS receiver 213 are spoofed GNSS signals based on the comparative test results.

In certain embodiments, the processor 205 may compare C/No measurements and C/No changes for the GNSS signals received from the different GNSS satellites in communication with the GNSS receiver 213, where the processor 205 uses previously received C/No measurements as C/No comparison values. The processor 205 may use the comparison to determine whether changes and values are common or similar across the different GNSS satellites. Also, the processor 205 may look for common or similar changes across the different GNSS satellites within a small time window. As described above, some spoofing devices may transmit noisy interference signals before transmitting higher power spoofing signals. The processor 205 may identify C/No measurement changes and values that occur across the different GNSS satellites as indications that a spoofing device is transmitting either interfering or higher power spoofing signals to the GNSS receiver 213.

In additional embodiments, the processor 205 may filter the received or estimated C/No measurements, such that the processor 205 may analyze different frequency regions that are associated with signals from spoofing devices or are sensitive to spoofing activities. Also, the processor 205 may receive already filtered C/No measurements. For example, the processor 205 may receive the C/No measurements from the GNSS receiver 213 and apply a filter to the received C/No measurements. The filter may be a bandpass filter having a particular passband associated with a frequency range in which GNSS spoofing signals are more likely to be received. After applying the filter, the processor 205 may monitor the filtered C/No measurements for changes in C/No per the other methods for detecting GNSS spoofing signals described herein.

Figure 3:
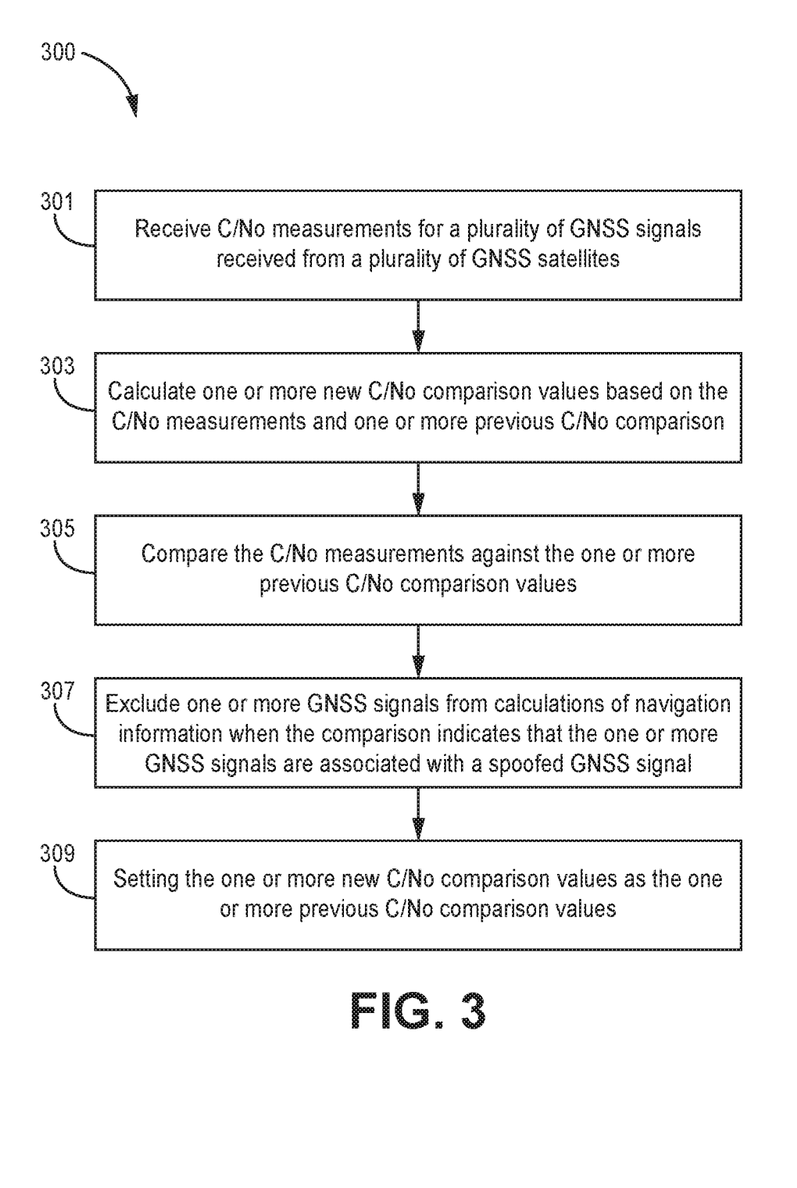
FIG. 3 is a flowchart diagram illustrating an exemplary method for GNSS spoofing detection using carrier-to-noise based monitoring according to an aspect of the present disclosure.

FIG. 3 is a flowchart diagram of a method 300 for performing GNSS spoofing detection using carrier-to-noise based monitoring. The method 300 proceeds at 301, where C/No measurements are received for a plurality of GNSS signals received from a plurality of GNSS satellites. Also, the method 300 proceeds at 303, where one or more new C/No comparison values are calculated based on the C/No measurements and one or more previous C/No comparison values. Further, the method 300 proceeds at 305, where the C/No measurements are compared against the one or more previous C/No comparison values. In additional embodiments, the method 300 proceeds at 307, where one or more GNSS signals are excluded from calculations of navigation information when the comparison indicates that the one or more GNSS signals are associated with a spoofed GNSS signal. Moreover, the method 300 proceeds at 309, where the one or more new C/No comparison values are set as the one or more previous C/No comparison values.

EXAMPLE EMBODIMENTS

Example 1 includes a system comprising: at least one GNSS receiver that provides carrier to noise ratio (C/No) measurements for a plurality of GNSS signals received from a plurality of GNSS satellites; and a processor coupled to the at least one GNSS receiver, wherein the processor executes instructions that cause the processor to: calculate one or more new C/No comparison values based on the C/No measurements and one or more previous C/No comparison values; compare the C/No measurements against the one or more previous C/No comparison values; determine whether one or more of the plurality of GNSS signals are spoofed based on the comparison of the C/No measurements against the one or more previous C/No comparison values; and set the one or more new C/No comparison values as the one or more previous C/No comparison values.

Example 2 includes the system of Example 1, wherein the processor calculates at least one new C/No comparison value in the one or more new C/No comparison values as a composite average of the received C/No measurements with at least one previous C/No comparison value in the one or more previous C/No comparison values.

Example 3 includes the system of Example 2, wherein the processor smooths the received C/No measurements before calculating the at least one new C/No comparison value.

Example 4 includes the system of any of Examples 1-3, wherein the processor calculates at least one new C/No comparison value in the one or more new C/No comparison values using satellite-signal power band measurements.

Example 5 includes the system of any of Examples 1-4, wherein the processor calculates at least one new C/No comparison value in the one or more new C/No comparison values as a long-time-constant smoothed C/No measurement.

Example 6 includes the system of any of Examples 1-5, wherein the processor calculates at least one new C/No comparison value in the one or more new C/No comparison values as an expected C/No based on at least one of: a satellite azimuth with a satellite elevation relative to the at least one GNSS receiver; and the satellite elevation relative to the at least one GNSS receiver.

Example 7 includes the system of any of Examples 1-6, wherein the processor compares the C/No measurements against the one or more previous C/No comparison values for changes that are common across multiple GNSS satellites in the plurality of GNSS satellites.

Example 8 includes the system of any of Examples 1-7, wherein the instructions further cause the processor to: filter the C/No measurements; and calculate at least one new C/No comparison value in the one or more C/No comparison values using the filtered C/No measurements.

Example 9 includes the system of any of Examples 1-8, wherein the processor excludes at least one GNSS signal in the plurality of GNSS signals from calculations of navigation information when the processor determines that the at least one GNSS signal is associated with a spoofed GNSS signal.

Example 10 includes a method comprising: receiving carrier to noise ratio (C/No) measurements for a plurality of GNSS signals received from a plurality of GNSS satellites; calculating one or more new C/No comparison values based on the C/No measurements and one or more previous C/No comparison values; comparing the C/No measurements against the one or more previous C/No comparison values; excluding one or more GNSS signals of the plurality of GNSS signals from calculations of navigation information when the comparison of the C/No measurements against the one or more previous C/No comparison values indicates that the one or more GNSS signals are associated with a spoofed GNSS signal; and setting the one or more new C/No comparison values as the one or more previous C/No comparison values.

Example 11 includes the method of Example 10, wherein calculating at least one new C/No comparison value in the one or more new C/No comparison values comprises calculating a composite average of the received C/No measurements with at least one previous C/No comparison value in the one or more previous C/No comparison values.

Example 12 includes the method of Example 11, further comprising smoothing the received C/No measurements before calculating the at least one new C/No comparison value.

Example 13 includes the method of any of Examples 10-12, wherein comparing the C/No measurements against the one or more previous C/No comparison values comprises: calculating one or more estimated C/No measurements based on satellite-signal power band measurements; and comparing the received C/No measurements against the one or more estimated C/No measurements.

Example 14 includes the method of any of Examples 10-13, wherein calculating at least one new C/No comparison value in the one or more new C/No comparison values comprises calculating the at least one new C/No comparison value based on a long-time-constant smoothed C/No measurement.

Example 15 includes the method of any of Examples 10-14, wherein calculating at least one new C/No comparison value in the one or more new C/No comparison values comprises calculating the at least one new C/No comparison value as an expected C/No based on at least one of a calculated satellite azimuth with a satellite elevation relative to an antenna coupled to a GNSS receiver and the satellite elevation relative to the antenna coupled to the GNSS receiver, wherein the GNSS receiver provides at least one C/No measurement in the received C/No measurements.

Example 16 includes the method of any of Examples 10-15, wherein comparing the C/No measurements against the one or more previous C/No comparison values comprises monitoring the C/No measurements for changes that are common across multiple GNSS satellites in the plurality of GNSS satellites.

Example 17 includes the method of any of Examples 10-16, further comprising: filtering the received C/No measurements; and calculating at least one new C/No comparison value in the one or more C/No comparison values using the filtered C/No measurements.

Example 18 includes a system comprising: at least one GNSS receiver that provides carrier to noise ratio (C/No) measurements for a plurality of GNSS signals received from a plurality of GNSS satellites; and a processor coupled to the at least one GNSS receiver, wherein the processor executes instructions that cause the processor to determine whether a GNSS signal is associated with a spoofed GNSS signal by monitoring the C/No measurement through at least one of: comparing the C/No measurements against a calculated composite average of the C/No measurements; comparing the C/No measurements against an estimated C/No measurement that is estimated based on satellite-signal power band measurements; comparing the C/No measurements against a long-time constant smoothed C/No measurement; comparing the C/No measurements against an expected C/No measurement that is based on at least one of a calculated satellite azimuth with a calculated satellite elevation relative to at least one GNSS antenna coupled to the at least one GNSS receiver and the calculated satellite elevation relative to at least one GNSS antenna coupled to the at least one GNSS receiver; identifying changes to the C/No measurements that are common across multiple GNSS satellites in the plurality of GNSS satellites; and filtering the received C/No measurements.

Example 19 includes the system of Example 18, wherein the calculated composite average of the C/No measurements is calculated by smoothing the C/No measurements.

Example 20 includes the system of any of Examples 18-19, wherein the processor excludes at least one GNSS signal in the plurality of GNSS signals from calculations of navigation information based on the determination of whether the at least one GNSS signal is associated with a spoofed GNSS signal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   at least one GNSS receiver that provides carrier to noise ratio (C/No) measurements for a plurality of GNSS signals received from a plurality of GNSS satellites; and
   a processor coupled to the at least one GNSS receiver, wherein the processor executes instructions that cause the processor to:
      calculate one or more new C/No comparison values using at least one of the C/No measurements and one or more previous C/No comparison values, wherein a previous C/No comparison value is a C/No comparison value used to check at least one previously received C/No measurement for the plurality of GNSS signals;
      compare the C/No measurements against the one or more new C/No comparison values;
      determine whether one or more of the plurality of GNSS signals are spoofed by comparing the C/No measurements against the one or more new C/No comparison values; and
      set the one or more new C/No comparison values as the one or more previous C/No comparison values.

2. The system of claim 1, wherein the processor calculates at least one new C/No comparison value in the one or more new C/No comparison values as a composite average of the received C/No measurements with at least one previous C/No comparison value in the one or more previous C/No comparison values.

3. The system of claim 2, wherein the processor smooths the received C/No measurements before calculating the at least one new C/No comparison value.

4. The system of claim 1, wherein the processor calculates at least one new C/No comparison value in the one or more new C/No comparison values using satellite-signal power band measurements.

5. The system of claim 1, wherein the processor calculates at least one new C/No comparison value in the one or more new C/No comparison values as a long-time-constant smoothed C/No measurement.

6. The system of claim 1, wherein the processor calculates at least one new C/No comparison value in the one or more new C/No comparison values as an expected C/No based on at least one of:
   a satellite azimuth with a satellite elevation relative to the at least one GNSS receiver; and
   the satellite elevation relative to the at least one GNSS receiver.

7. The system of claim 1, wherein the processor compares the C/No measurements against the one or more previous C/No comparison values for changes that are common across multiple GNSS satellites in the plurality of GNSS satellites.

8. The system of claim 1, wherein the instructions further cause the processor to:
   filter the C/No measurements; and
   calculate at least one new C/No comparison value in the one or more C/No comparison values using the filtered C/No measurements.

9. The system of claim 1, wherein the processor excludes at least one GNSS signal in the plurality of GNSS signals from calculations of navigation information when the processor determines that the at least one GNSS signal is associated with a spoofed GNSS signal.

10. A method comprising:
    receiving carrier to noise ratio (C/No) measurements for a plurality of GNSS signals received from a plurality of GNSS satellites;
    calculating one or more new C/No comparison values using at least one of the C/No measurements and one or more previous C/No comparison values, wherein a previous C/No comparison value is a C/No comparison value used to check at least one previously received C/No measurement for the plurality of GNSS signals;
    comparing the C/No measurements against the one or more new C/No comparison values;
    excluding one or more GNSS signals of the plurality of GNSS signals from calculations of navigation information when the comparison of the C/No measurements against the one or more new C/No comparison values indicates that the one or more GNSS signals are associated with a spoofed GNSS signal; and
    setting the one or more new C/No comparison values as the one or more previous C/No comparison values.

11. The method of claim 10, wherein calculating at least one new C/No comparison value in the one or more new C/No comparison values comprises calculating a composite average of the received C/No measurements with at least one previous C/No comparison value in the one or more previous C/No comparison values.

12. The method of claim 11, further comprising smoothing the received C/No measurements before calculating the at least one new C/No comparison value.

13. The method of claim 10, wherein comparing the C/No measurements against the one or more previous C/No comparison values comprises:
    calculating one or more estimated C/No measurements based on satellite-signal power band measurements; and
    comparing the received C/No measurements against the one or more estimated C/No measurements.

14. The method of claim 10, wherein calculating at least one new C/No comparison value in the one or more new C/No comparison values comprises calculating the at least one new C/No comparison value based on a long-time-constant smoothed C/No measurement.

15. The method of claim 10, wherein calculating at least one new C/No comparison value in the one or more new C/No comparison values comprises calculating the at least one new C/No comparison value as an expected C/No based on at least one of a calculated satellite azimuth with a satellite elevation relative to an antenna coupled to a GNSS receiver and the satellite elevation relative to the antenna coupled to the GNSS receiver, wherein the GNSS receiver provides at least one C/No measurement in the received C/No measurements.

16. The method of claim 10, wherein comparing the C/No measurements against the one or more previous C/No comparison values comprises monitoring the C/No measurements for changes that are common across multiple GNSS satellites in the plurality of GNSS satellites.

17. The method of claim 10, further comprising:
    filtering the received C/No measurements; and
    calculating at least one new C/No comparison value in the one or more C/No comparison values using the filtered C/No measurements.

18. A system comprising:
at least one GNSS receiver that provides carrier to noise ratio (C/No) measurements for a plurality of GNSS signals received from a plurality of GNSS satellites; and
a processor coupled to the at least one GNSS receiver, wherein the processor executes instructions that cause the processor to determine whether a GNSS signal is associated with a spoofed GNSS signal by monitoring the C/No measurement through at least one of:
comparing the C/No measurements against a calculated composite average of the C/No measurements;
comparing the C/No measurements against an estimated C/No measurement that is estimated based on satellite-signal power band measurements;
comparing the C/No measurements against a long-time constant smoothed C/No measurement;
comparing the C/No measurements against an expected C/No measurement that is based on at least one of a calculated satellite azimuth with a calculated satellite elevation relative to at least one GNSS antenna coupled to the at least one GNSS receiver and the calculated satellite elevation relative to at least one GNSS antenna coupled to the at least one GNSS receiver;
identifying changes to the C/No measurements that are common across multiple GNSS satellites in the plurality of GNSS satellites; and
filtering the received C/No measurements.

19. The system of claim 18, wherein the calculated composite average of the C/No measurements is calculated by smoothing the C/No measurements.

20. The system of claim 18, wherein the processor excludes at least one GNSS signal in the plurality of GNSS signals from calculations of navigation information based on the determination of whether the at least one GNSS signal is associated with a spoofed GNSS signal.

* * * * *